US008466918B2

(12) United States Patent
Steinstraesser

(10) Patent No.: US 8,466,918 B2
(45) Date of Patent: Jun. 18, 2013

(54) METHOD FOR GENERATING A FONT-BASED SPARKLINE

(75) Inventor: Ralf Steinstraesser, Nuremberg (DE)

(73) Assignee: Bissantz & Company GmbH, Nuremberg (DE)

( * ) Notice: Subject to any disclaimer, the term of this patent is extended or adjusted under 35 U.S.C. 154(b) by 1690 days.

(21) Appl. No.: 11/529,413

(22) Filed: Sep. 28, 2006

(65) Prior Publication Data

US 2008/0079661 A1 Apr. 3, 2008

(51) Int. Cl.
*G06T 11/20* (2006.01)

(52) U.S. Cl.
USPC .......................................................... 345/440

(58) Field of Classification Search
CPC ..................................................... G06T 11/206
USPC ....................................... 345/440, 440.1, 442
See application file for complete search history.

(56) References Cited

U.S. PATENT DOCUMENTS

| | | | | |
|---|---|---|---|---|
| 4,620,287 A * | 10/1986 | Yam | ............................. | 345/442 |
| 4,849,910 A * | 7/1989 | Jacobs et al. | .................. | 345/442 |
| 5,208,904 A * | 5/1993 | Sasaki | ........................... | 345/442 |
| 5,509,113 A * | 4/1996 | Takakura et al. | ............. | 345/442 |
| 6,373,484 B1 * | 4/2002 | Orell et al. | ..................... | 345/440 |
| 6,909,430 B2 * | 6/2005 | Dresevic et al. | .............. | 345/442 |
| 7,468,727 B2 * | 12/2008 | Wong et al. | .................. | 345/440 |

OTHER PUBLICATIONS

Robert F. Erbacher, Glyph-Based Generic Network Visualization, 2002, Proc. SPIE Conference on Visualization and Data Analysis 2002, SPIE vol. 4665, p. 228-237.*
Robert F. Erbacher, Kenneth L. Walker, and Deborah A. Frincke, Intrusion and Misuse Detection in Large-Scale Systems, 2002, IEEE Computer Graphics and Applications, vol. 22 Issue: 1, pp. 38-48.*
Anita Komlodi, John R. Goodall, and Wayne G. Lutters, An Information Visualization Framework for Intrusion Detection, 2004, Conference on Human Factors in Computing Systems, CHI '04 extended abstracts on Human factors in computing systems, pp. 1743-1746.*
Jul. 17, 2006 Internet archive web page for SparkFonts, printed from Internet archive on Jun. 11, 2010, http://web.archive.org/web/20060717093228/www.bissantz.de/sparklines/sparkfonts.asp, p. 1-2.*

* cited by examiner

*Primary Examiner* — Jeffery A Brier
(74) *Attorney, Agent, or Firm* — Dilworth & Barrese, LLP.

(57) ABSTRACT

The present invention relates to a method for generating a font-based sparkline, the sparkline being composed of two or more than two glyphs, said glyphs comprising one or more lines or consisting of one or more lines, which lines have two margins defining the thickness of the lines, the method comprising the step of providing at least one shaping element having a contour which at least in part is rounded and locating said shaping element at a position at which neighboring lines of two adjoining glyphs terminate, wherein said shaping element is located so that at least a portion of said contour is in alignment or in approximate alignment with at least one of the margins of one or both of said neighboring lines.

7 Claims, 4 Drawing Sheets

PRIOR ART

Figure 6
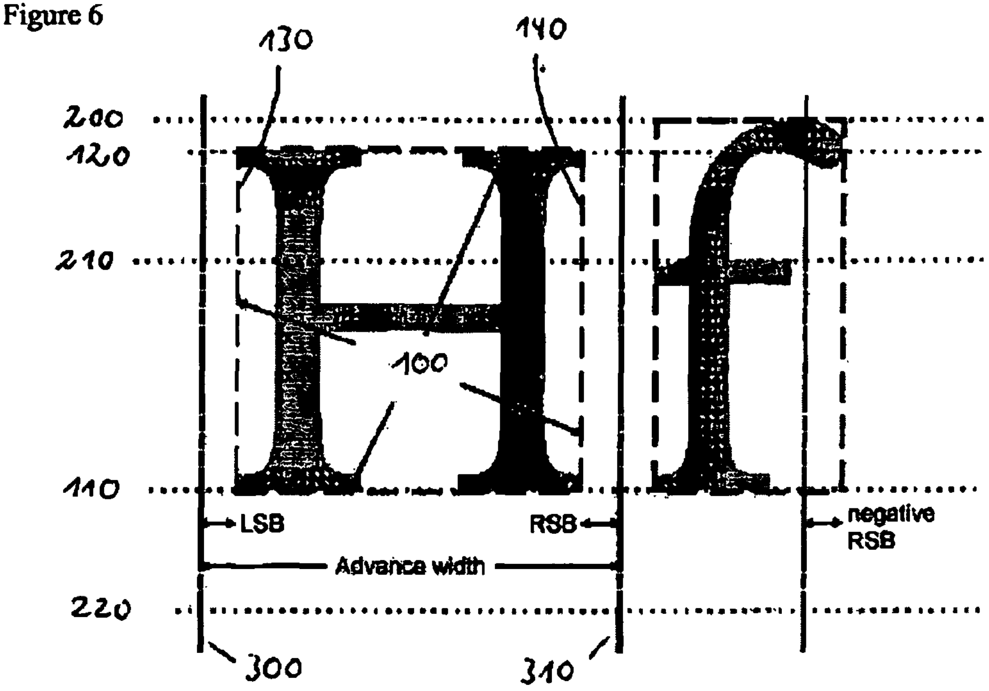
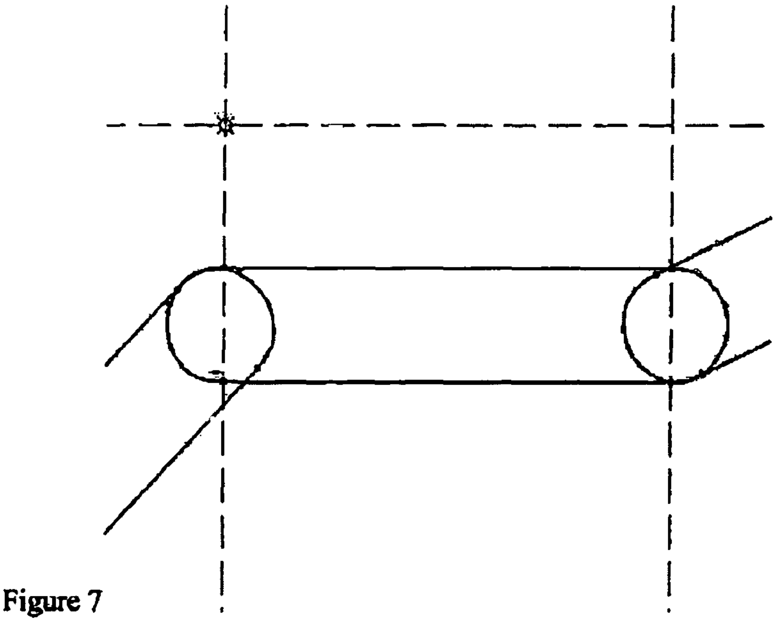
Figure 7

METHOD FOR GENERATING A FONT-BASED SPARKLINE

BACKGROUND OF THE INVENTION

The present invention relates to a method for generating a font-based sparkine.

In order to display a large amount of information in a compact and intelligible form it is known from the prior art to use so-called sparklines which are word-sized, minimized diagrams. Sparklines provide dense information in small spaces. Font-based sparklines are composed of glyphs which are located side by side so as to form the sparkline.

Sparklines for example may be provided as lines or column graphics. Further embodiments of sparklines are also known in the art.

Known methods for generating a sparkline which is composed of glyphs which comprise or consist of lines suffer from the drawback that the thickness of the lines forming the sparkline varies within the sparkline. This results in an uneven and non-uniform appearance of the sparkline. An example of such prior art sparkline is shown in FIG. 1 which clearly demonstrates that the thickness of the lines which form the sparkline varies within the sparkline.

The reason for this phenomenon resides in the fact that according to known methods two adjoining glyphs are assembled so that the height of the adjoining lines at the linking portion is identical. This is shown in FIG. 2. The line of the left hand glyph has a height which corresponds to the line thickness. The line of the right hand glyph has a height which corresponds to the thickness of the left hand glyph. However, due to the fact that the line of the right hand glyph has a slope which differs from that of the left hand glyph the line thickness of the right hand glyph is smaller. The thickness of the line of the right hand glyph thus depends on the difference in slopes between the lines of the neighboring glyphs. Only if the slopes of the lines of the neighboring glyphs are identical the thickness of the lines is also identical.

It is of course also possible to provide an equal thickness for the lines of the glyphs independent of the slopes. This, however, will lead to the drawback that overlapping portions will occur or that gaps will occur between the lines. Examples therefore are shown in FIG. 3.

SUMMARY OF THE INVENTION

It is the object of the present invention to provide a method for generating a font-based sparkline which necessitates neither said overlapping portions nor said gaps between the sparklines and which allows to provide sparklines having a uniform thickness of the lines.

This object is solved by a method according to the description herein. The method according to the present invention comprises the step of providing at least one shaping element having a contour which is at least in part a rounded contour and locating said shaping element at a position at which neighbouring lines of two adjoining glyphs terminate, wherein said shaping element is located so that at least a portion (straight or curved line) of said contour is in alignment or in approximate alignment with at least one of the margins of one or both of said neighbouring lines. This allows to provide a smooth transition from one margin of a line of a first glyph to the contour of the shaping element and a smooth transition from the contour of the shaping element to the margin of a line of a second glyph which is located adjacent the first glyph.

The result is a uniform appearance of the sparkline. Accordingly the method does not necessitate to provide a different thickness of the lines of neighboring glyphs as in the prior art which is shown in FIG. 2. The method further avoids the presence of the projecting portions as well of gaps which are shown in FIG. 3.

It is preferred that the thickness of the line or at least some of the lines of the glyphs is equal or nearly equal to each other for at least some or all of the glyphs.

The shaping element may be for example a circle or may have a rounded portion which is a portion of a circle such as a semicircle.

The shaping element may be a separate glyph which located so as to provide a smooth transition between two glyphs forming part of the sparkline.

However, it is preferred that the shaping element is an integral part of said glyphs which comprise or consist of one or more lines which form the sparkline. For example the glyph may be a straight or curved line, wherein the end portion of the line is rounded, for example in form of a semicircle which has a diameter which corresponds to the thickness of the line.

In accordance with a further embodiment of the invention the glyphs have a first terminating portion and a second terminating portion, wherein both of said terminating portions are formed by lines, the ends of which are formed by said shaping elements. Accordingly, the sparkline may be composed of lines wherein at each end portion of said lines the shaping element is located, which in other words means that both end portions of the lines of the glyphs have a rounded contour.

As mentioned above, the rounded contour of the shaping elements may be a circle or part of circle having a radius which corresponds or approximately corresponds to half of the thickness of the lines.

The glyphs may be defined by a left border and by a right border, which borders define the transition from one glyph to a neighbouring glyph. Two adjacent glyphs thus contact each other at the right border of the left glyph and the left border of the right glyph. The glyphs may further be defined by a bounding area having a left boundary and a right boundary, which boundaries are the left and right limits of the visible portion of the glyph. If a glyph is or comprises for example a line, the line is located between the left boundary which is located exactly at the left end portion of the line and the right boundary which is located exactly at the right end portion of the line. The area between said boundaries is called bounding area.

Further, the glyph may have a left side bearing which is the space between the left border of the glyph and the left boundary of the bounding area and by a right side bearing which is the space between the right border of the glyph and the right boundary of the bounding area.

In accordance with a preferred embodiment of the invention one or both of the left side bearing and the right side bearing of the glyphs are negative which in other words means that the bounding area of one glyph overlaps the border of the neighboring glyph. Providing a negative left side bearing and/or right side bearing thus moves together the bounding areas of two adjacent glyphs and thus may lead to an overlap of the visible portions, for example of the lines of the glyphs.

Preferably, the left side bearing and the right side bearing are equal to each other and more preferred are both negative.

In accordance with a preferred embodiment of the invention the rounded contour of the shaping elements is a circle or part of circle such as semicircle, wherein the left side bearing and the right side bearing of the glyphs are each negative and wherein the amount of the left side bearing and of the right side bearing corresponds or approximately corresponds to the radius of said circle or said part of a circle. In this case it is possible to locate the glyphs so that the margin of a line of a first glyph and the margin of a line of a second adjacent glyph exactly align with the rounded portion of the shaping element which in this embodiment is formed by the end portions of the lines. Thereby a smooth transition between the lines of two neighboring glyphs is obtained.

BRIEF DESCRIPTION OF THE DRAWINGS

Further advantages and embodiments of the invention are explained on the basis of the figures.

FIGS. 4, 5 and 7 show representations of a portion of a sparkline and of a sparkline generated by the method according to the present invention and FIG. 6 shows a representation explaining the metrics of a glyph.

DETAILED DESCRIPTION OF THE INVENTION

Figure 1:
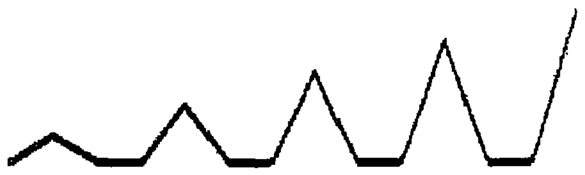
FIGS. 1 and 2 show representations of a sparkline and of a portion thereof being composed of lines with different thickness generated by a prior art method.
Figure 2:
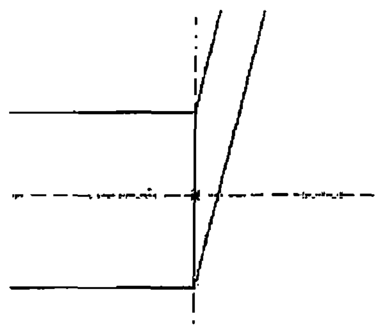
PRIOR ART Figure 2

As outlined above FIGS. 1 and 2 are directed to sparklines which have been generated by a prior art method and which unveil the disadvantage that the thickness of the lines forming the sparkline varies dependent on the slope of the lines. The higher the difference between the slopes of two adjacent lines the higher is the difference in the thickness of the lines which effect is shown in FIG. 1. This is due to the fact that the height of the adjacent lines equals at the portion at which the lines are adjoining which is evident from FIG. 2.

Figure 3:
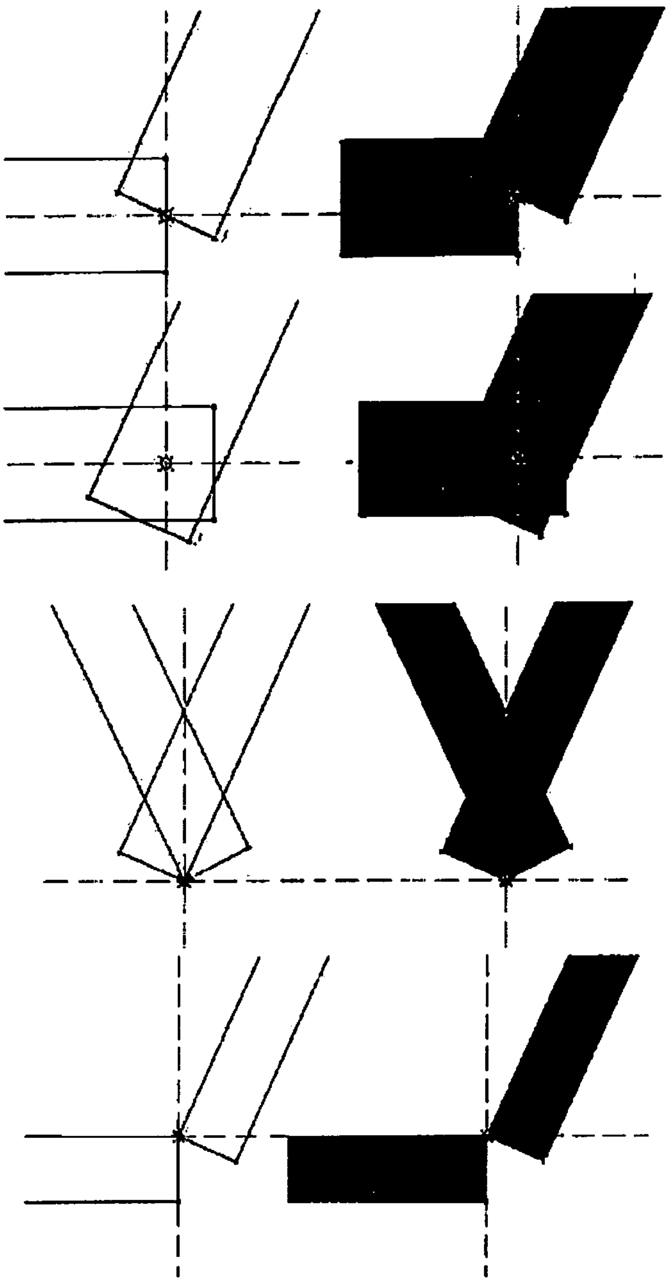
PRIOR ART Figure 3
FIG. 3 shows representations 6f sparklines being composed of lines with equal thickness generated by a prior art method.

FIG. 3 is directed to details of the adjoining portions of lines of a sparkline wherein the lines forming the sparkline each have the same thickness. This, however, results in an uneven and rough transition between two lines which is caused by overlapping portions of one line over the other and/or by gaps between the lines.

Figure 4:
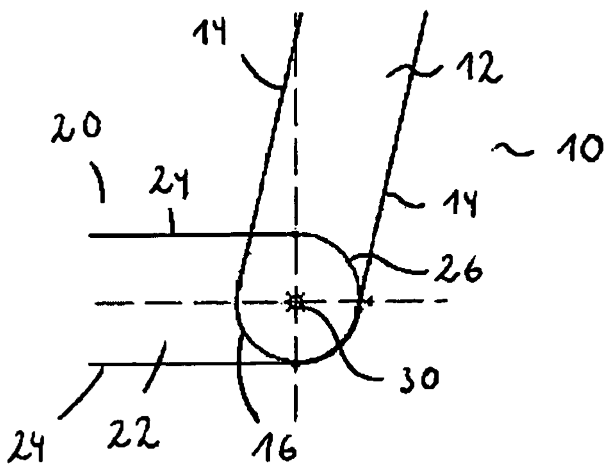

FIG. 4 is a representation of a portion of a sparkline according to the present invention. As may be gathered from FIG. 4 this embodiment of the invention is directed to glyphs comprising or consisting of one or more straight or curved lines, wherein each of the lines has rounded end portion which forms the claimed shaping element. The end portion is a semicircle or at least approximately a semicircle having a radius which corresponds to half of the thickness of the line.

FIG. 4 shows a first glyph 10 comprising a line 12 which is inclined and a second glyph 20 comprising a line 22 which is horizontal.

Line 12 has margins 14 which are parallel to each other and which define the thickness of line 12. In the end portion of line 12 the margins 14 are linked to each other by the semicircular portion 16. At the adjoining portion between the margins 14 and the semicircular portion 16 the semicircular portion 16 aligns with the margins 14.

Similarly, line 22 has margins 24 which are parallel to each other and which define the thickness of line 22. In the end portion of line 22 the margins 24 are linked to each other by the semicircular portion 26. At the adjoining portion between the margins 24 and the semicircular portion 26 the semicircular portion 26 aligns with the margins 24.

The thickness of line 12 corresponds to the thickness of line 22. Each of the semicircular portions 16, 26 has a diameter which corresponds with the thickness of the lines 12, 22. The centres 30 of the semicircular portions 16, 26 coincide and are located on the centrelines of the lines 12, 22, respectively.

As may be further gathered from FIG. 4 the glyphs 10, 20 are located to each other so as to obtain a smooth transition between both lines 12, 22. This result is obtained by a method explained below.

Figure 5:

As a result an even and uniform sparkline is obtained which is for example shown in FIG. 5.

FIG. 6 explains the metrics of a glyph as follows:

Each of the glyphs forming the sparkline has a bounding box 100 which is defined by lines 110 (baseline) and 120 (caps height) as well as by left and right boundaries 130 and 140. The distance between the right and left boundaries defines the width of the visible portion of the glyph, which is in the present example the width of a character H. In other words the bounding box 100 is defined by the dimensions of the symbol, which is the visible portion of a glyph.

Lines 200, 210 and 220 define the ascender, the x-height and the descender, respectively.

As is further evident from FIG. 6 the total width (advance width) of the glyph is the space between the left border 300 and the right border 310. The space between the left border 300 and the left boundary 130 is called left side bearing (LSB) and the space between the right border 310 and the right boundary 140 is called right side bearing (RSB).

Two adjacent glyphs are adjoining at their borders 300, 310.

The LSB and/or the RSB may be zero, positive or negative. In case of a negative LSB or RSB the border 300 or 310 is moved into the bounding box 100 which is the case in the right hand example in FIG. 6 which has a negative RSB.

In accordance with a preferred embodiment of the invention the method generates a sparkline by assembling glyphs, wherein the glyphs have a negative LSB and a negative RSB. LSB and RSB are equal to each other and correspond to the radius of the semicircular end portion of the lines. This results in an overlapping arrangement of the adjacent lines which is shown in FIG. 7. In order to obtain a smooth transition which is shown in FIG. 7 the method ensures that the vertical position of the glyphs is defined in such way that the lines align at their lower portion in case of an increase of the slope from one line to the next line (right hand portion of FIG. 7) and align at their upper portion is case of a decrease of the slope from one line the next line (left hand portion of FIG. 7). This may be obtained by locating the centres of the semicircular portions of the adjoining lines at the same vertical level.

In the embodiment shown in FIG. 4 and 7 the shaping element is formed by the semicircular end portion of the lines of the glyphs and is thus in this example an integral portion of the visible portion (i.e. of the symbol) of the glyph which in the present example is formed by a line. Thus each glyph may consist of a line, the terminating portions of which are rounded for example in form of a semicircle. Providing negative LSB and RSB of the glyphs which amount to the radius of the semicircle results in a sparkline which is shown in FIG. 7.

The present invention is of course not limited to a generation of a sparkline which extends in a horizontal direction but also includes other orientations of sparklines, such for example a vertically oriented sparkline which is created by assembling glyphs not side by side but above each other.

The method according to the present invention may be realized in form of a computer program which causes a computer to perform said method for generating a sparkline.

The invention claimed is:

1. A method for generating, by a computer, a font-based sparkline, comprising the steps of:

a computer program causing the computer to display the sparkline by locating two or more than two glyphs out of a plurality of predefined glyphs side by side so as to form said sparkline, each of said glyphs out of said plurality of predefined glyphs having a predefined visible portion comprising at least one predefined line having two margins defining the thickness of the lines, wherein in each glyph out of said plurality of predefined glyphs the predefined line comprised in said visible portion of said glyph has a first terminating portion and a second terminating portion, wherein the end of at least one out of said first terminating portion or said second terminating portion is formed by a shaping element, such that the line and the shaping element form an integral part of said predefined visible portion of said glyph, wherein the shaping element has a rounded contour formed by a circle or part of circle having a radius which corresponds or approximately corresponds to half of the thickness of the line and wherein said contour is in alignment with the margins of the terminating portion of the line, wherein each glyph out of said plurality of predefined glyphs has a predefined left border and right border, which borders define the transition from one glyph to an adjoining glyph, a predefined bounding area having a left boundary and a right boundary, which boundaries are the left and right limits of the predefined visible portion of the glyph, as well as a predefined left side bearing which is the space between the left border of the glyph and the left boundary of the bounding area and a predefined right side bearing which is the space between the right border of the glyph and the right boundary of the bounding area, wherein the predefined left border and right border of all the glyphs out of said plurality of predefined glyphs are parallel to each other, wherein one or both of the predefined left side bearing and the predefined right side bearing of the glyphs are negative, wherein the computer program causes the computer to generate the sparkline by assembling at least a first and a second glyph out of said plurality of predefined glyphs side by side with their respective left or right parallel borders adjoining, and wherein said one or both of said negative left and right side bearing is predefined in such a way that a shaping element forming a first or second terminating portion of a predefined first line comprised in a predefined visible portion of the first glyph overlaps with a first or second terminating portion of a predefined second line comprised in a predefined visible portions of the second glyph to obtain a smooth transition between said predefined first and second lines.

2. The method according to claim 1, wherein the thickness of the line or at least of some of the lines of the glyphs is equal or nearly equal to each other in all at some of the glyphs.

3. The method according to claim 1, wherein both of said first and second terminating portions in each of said glyph out of said plurality of predefined glyphs are formed by a line, the end of which is formed by said shaping element.

4. The method according to claim 1, wherein the bounding area is a bounding box.

5. The method according to claim 1, wherein one or both of the left side bearing and the right side bearing of the glyphs are negative.

6. The method according to claim 1, wherein the left side bearing and the right side bearing are equal to each other.

7. The method according to claim 1, wherein the rounded contour of the shaping elements is a circle or part of circle and wherein the left side bearing and the right side bearing of the glyph are each negative, wherein the amount of the left side bearing and of the right side bearing corresponds or approximately corresponds to the radius of said circle or part of a circle.

* * * * *